United States Patent Office 2,715,717
Patented Aug. 16, 1955

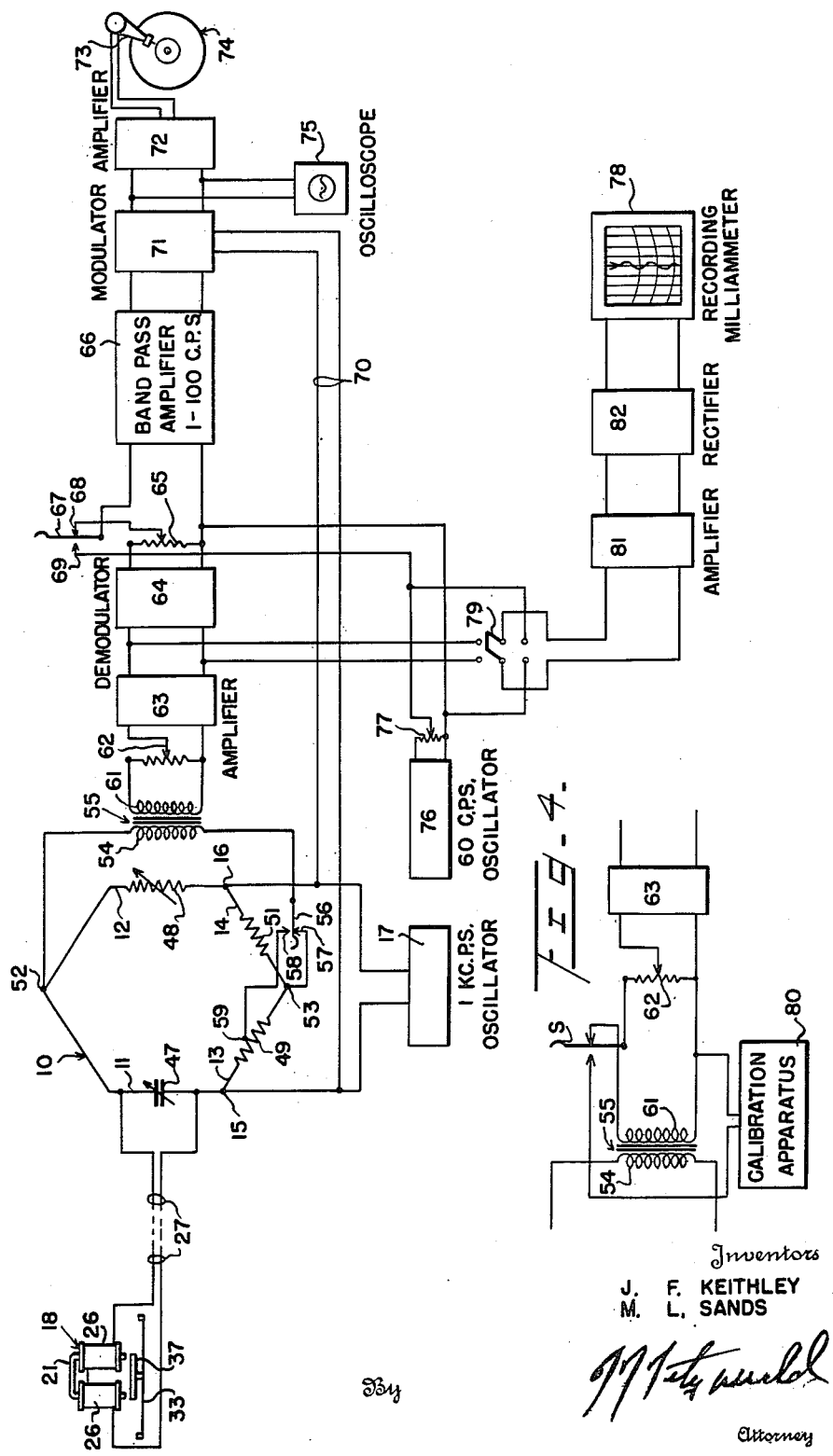

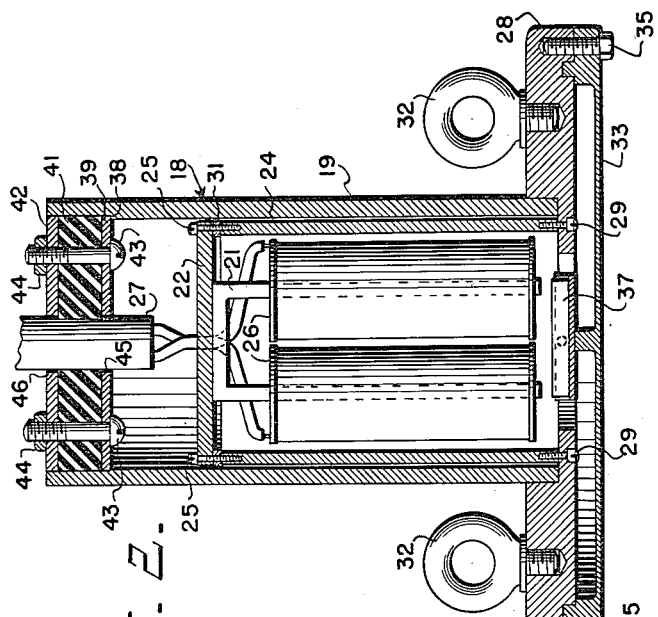
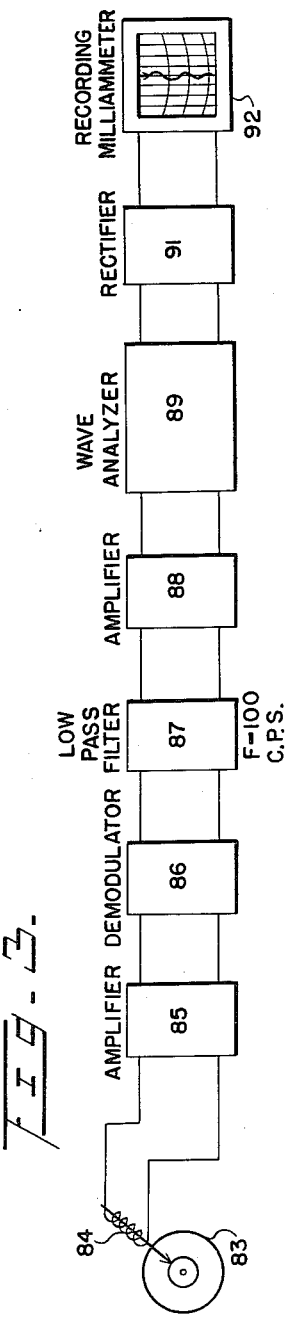

2,715,717

METHOD AND APPARATUS FOR MEASURING AND ANALYZING TRANSIENT PRESSURES IN A BODY OF WATER

Joseph F. Keithley and Matthew L. Sands, Washington, D. C.

Application March 25, 1943, Serial No. 480,576

16 Claims. (Cl. 340—4)

(Granted under Title 35, U. S. Code (1952), sec. 266)

This invention relates to a method and apparatus for measuring variations in pressure and more particularly to a method and apparatus for measuring and analyzing transient pressures in a body of water.

Variations in pressure below the surface of a body of water are caused by such transient phenomena as sounds, turbulence, waves, tides and seiches, the latter being a term used in defining the oscillation of the surface of a lake, a landlocked sea or an arm of the sea having a restricted entrance, which varies in period from a few minutes to several hours. It is sometimes desirable to study such phenomena which may occur over either short or long periods of time in places which are difficult of access and under conditions which are not likely to be repeated to determine whether or not they act in concert or in opposition and the manner in which they modify each other.

This information is useful in understanding the causes of erosion or other destructive effects produced upon the beaches and shores adjacent large bodies of water by the disturbances therein. Another use for information relating to these phenomena is to study the effect produced thereby on ships or other floating objects on the surface of the body of water and on objects submerged therein and to determine whether such ships and submerged objects produce any modification of the subsurface phenomena. It is also desirable in making seismic surveys underwater to determine whether their accuracy is in any way affected by the other subsurface phenomena and to what extent.

In attempting to measure these phenomena, difficulties are caused by the fact that each of them has a frequency and an amplitude which varies from the frequency and amplitude of each of the other phenomena so that in designing an apparatus for the measurement thereof, it has been found difficult to produce one which will simultaneously respond to both low frequencies and high frequencies of varying amplitudes with equal accuracy and facility. Another difficulty arises from the fact that in devices in which a microphone is used to measure transient pressure phenomena at various depths in a body of water, it is found that the microphone does not have a linear response and a constant sensitivity at different depths due to the fact that the diaphragm of the microphone changes its flexibility with changes in pressure thereon. For instance, as the pressure increases on a microphone diaphragm the flexibility of the diaphragm decreases and, conversely, as the pressure on the diaphragm decreases the flexibility increases. Where it is desired to measure pressures throughout a range of depths, this leads to inaccuracies in the results as it is difficult to correlate the results produced at one depth with those produced at another depth.

Another difficulty arises when making subsurface measurements of pressure in the fact that a long length of cable is required to connect the microphone or other electrical detecting device located below the surface of the body of water with apparatus for indicating or recording the pressure changes located above the surface of the body of water. Such cables have capacitance effects produced thereby which enter into a signal being generated by the subsurface device and, therefore, render the results inaccurate especially if the length of the cable is changed to accommodate measurements at varying depths. Furthermore, the measurements taken at one depth could not be correlated with those taken at another depth because of the difference in capacity effect produced by the different lengths of cable employed.

In making measurements of subsurface pressure phenomena, the variations therein are of a transient nature so that it is impossible to analyze them into their various components on the spot. While a recorded trace may be made by means of a recording instrument and the trace subjected to future leisurely study, it is not in a form which may readily be analyzed to determine the component frequencies thereof and the magnitudes of the pressures at the respective frequencies.

One of the objects of the present invention is the provision of a new and improved method and apparatus for analyzing transient pressures in a body of water in which the foregoing difficulties are obviated and which is adapted to perform all the functions of the systems heretofore proposed or now in general use.

Another object of this invention is to provide a novel microphone for measuring subsurface pressures in a body of water which microphone will have a substantially constant percentage change of inductance with respect to the measured pressure throughout a predetermined depth range in which measurements are to be made.

Another object of the invention is to provide a novel method of adjusting a microphone to be employed in measuring subsurface pressures in a body of water so that said microphone will have a substantially constant percentage change of inductance with respect to the measured pressure throughout a predetermined depth range in which measurements are to be made.

Still another object is the provision of means to compensate for the capacitance of a cable connecting a microphone employed in measuring subsurface pressures with apparatus at the surface so that more accurate results can be obtained.

Another object of the invention is the provision of a network connected to a microphone for measuring pressures in a body of water which network will not produce distortion of the signal from a microphone.

A further object of the invention is the provision of means adapted to record accurately electrical signals produced by very low frequency underwater phenomena acting on a submerged microphone.

Still another object of the invention is the provision of a system capable of analyzing each component frequency of a recorded wave representative of the pressures acting on a submerged microphone.

An additional object of the invention resides in a novel and improved method and apparatus whereby electrical signals representative of transient pressure phenomena occurring in a body of water are recorded on a phonograph record or other recording means which may be analyzed at leisure at various frequencies to determine the resultant pressure produced by the pressure phenomena during any one period of time at a definite frequency.

In general, in an apparatus of the character comprising the present invention, a novel watertight microphone, adjusted to give a substantially linear response and a constant sensitivity for the particular range of depths at which measurements are to be made, is adapted to be submerged in a body of water, the output of the microphone being connected to a network which converts the signal into a form which is readily recordable on a phonograph record. The phonograph record is then removed from the scene at which the measurements were recorded to a more convenient place, such as a laboratory, where an apparatus is provided for replaying the record and analyzing the recorded measurements at various frequencies to determine the manner in which the various transient subsurface phenomena coact at such frequencies. For very low frequency phenomena having large amplitudes, the microphone signal is recorded as a trace by a recording milliammeter, or similar device, concurrently with the reception of signals by the microphone whereby the signals may be studied directly.

More specifically, the present invention provides a system wherein a microphone adapted for underwater use is submerged below the surface of a body of water at depths through which desired measurements are to be made. The microphone comprises a casing having therein a flexible diaphragm which carries an armature which cooperates with a U shaped core having a coil on each leg thereof. The microphone is provided with a novel feature in that the diaphragm and the core are adjustable with respect to one another so that for a particular range of depths in which measurements are to be made, the diaphragm may be adjusted with respect to the core to produce, with change in pressure on the diaphragm, a linear response in the change of inductance of the windings on the core when these windings are supplied with alternating current.

That this result is obtained is evident from the following explanation. It will be noted, as pointed out above, that the flexibility of the diaphragm changes with the change in pressure thereon. The rate of change of inductance of the windings on the core also changes as the armature attached to the diaphragm changes its distance from the core with change in pressure. However, when the microphone is submerged and the flexibility of the diaphragm decreases with increase in pressure, the armature carried by the diaphragm is forced by the increased pressure to reduce the gap between it and the core and, therefore, to increase the rate of change of inductance of the coils carried by the core. By proper adjustment of the initial gap between the armature and the core, it is possible for one of these factors to compensate for the change in the other factor substantially throughout a particular range of depths in which measurements are to be made.

The microphone is connected by a cable to a bridge network having four arms, the microphone being in one arm, a variable resistance forming the second arm and two fixed resistances forming the remaining two arms. The cable connecting the microphone to the bridge network, which is located at the surface of the body of water, has placed in shunt therewith a variable condenser, the purpose of this condenser being to adjust this arm of the bridge network so that it is resonant regardless of the length of cable employed in the connection between the microphone and the bridge network. The variable resistance arm of the bridge network is arranged to be adjusted so that the bridge can be substantially balanced for any depth at which measurements are to be made. The bridge is provided with input terminals which are supplied from a source of suitable frequency such as a one kilocycle per second oscillator. The output terminals of the bridge network are connected to means for demodulating any signal supplied by the microphone to the bridge network so as to eliminate the carrier frequency placed on the bridge by the oscillator. The output of the demodulator is supplied to a band pass amplifier which eliminates all frequencies above a predetermined value and the output of the band pass amplifier is then modulated at a frequency which is readily recordable and is then recorded on a phonograph record.

The output terminals of the bridge network are also connected through suitable amplifier and rectifier means to a recording milliammeter. The latter, because of its comparatively high inertia, acts as a mechanical filter and will record a trace of the subsurface phenomena having a low frequency variation in the neighborhood of one cycle per second or less.

The signals are recorded on the phonograph record and the milliammeter for the purpose of further leisurely study and also for the purpose of analysis of the different frequencies which form the components of the signal transmitted by the microphone to the apparatus. Such records are particularly useful if they have been made in places which are difficult of access or if they record phenomena which are not likely, if ever, to be repeated, as a phonograph record may be replayed a large number of times throughout the life of the record and thus make it unnecessary to return to the scene at which the record was made and await a repetition of the original conditions under which the recorded phenomena were produced. The phonograph record may be carried from the scene of operation to a laboratory and then analyzed by means of an apparatus which is capable of dissecting the recorded signal into its component frequencies and making a record of each of said components.

This apparatus comprises a pickup device which is arranged to respond to the recorded signal. The pickup device is connected to a demodulator for removing the modulating wave and the output from the demodulator is supplied to a low pass filter for eliminating all frequencies above a predetermined range which contains those frequencies it is desired to study. The filtered signal is then supplied to a wave analyzer of a well known commercial type which analyzer may be set to pass only a single desired frequency. The output of the wave analyzer is then fed to a rectifier which supplies a recording milliammeter, the latter then making a trace of the average absolute value of the desired wave.

A trace of the desired wave can also be obtained by substituting a suitable oscillograph in place of the rectifier and the recording milliammeter. With this analysis apparatus and the trace of the low frequency it is possible to study the signals for all frequencies up to a desired value so as to determine the effects of sound, turbulence, waves, tides and seiches at different frequencies.

In order to properly calibrate the system so that signals taken at different times may be correlated with each other, the recording apparatus is provided with an oscillator which produces a constant known frequency and an indicating device for setting the output voltage of the oscillator to a definite magnitude before any record is made. The latter oscillator is connected to the system and the signal of known magnitude is recorded. After any measurement made by the microphone has been recorded, the procedure of recording the known frequency is repeated. This gives a standard for setting the analyzing system when analyzing the signals recorded by the microphone. Other calibrating and standardizing means are also provided to assure accuracy in the results obtained.

Still other objects, advantages and improvements will become apparent from the following detailed description taken in connection with the accompanying drawings in which:

Fig. 1 is a diagram of a recording apparatus to be employed in accordance with the present invention;

Fig. 2 is a sectional view of a microphone to be employed in the apparatus of Fig. 1;

Fig. 3 is a diagram of the analyzing system employed for analyzing the phonograph records produced by the apparatus of Fig. 1; and, Fig. 4 illustrates diagrammatically a circuit arrangement suitable for calibrating the apparatus between the output of the bridge network and the modulator of Fig. 1.

Referring now to the drawings on which like numerals of reference are employed to designate like parts throughout the several views and more particularly to Fig. 1 thereof, there is shown thereon a recording system for analyzing submarine pressures in accordance with the present invention. Specifically, the recording system comprises a bridge network shown generally by the numeral 10 and comprising four arms 11, 12, 13 and 14 energized at input terminals 15 and 16 from a one kilocycle per second oscillator 17. The arm 11 includes therein a microphone unit shown generally by the numeral 18 and illustrated in detail in Fig. 2.

The microphone unit 18 comprises a casing 19 made of a non-magnetic metal preferably of a non-corrodable material such as brass or the like. This casing encloses a laminated U-shaped member 21 made of a highly permeable magnetic material such as the material known as Permalloy in the trade. The U-shaped member 21 is attached to a disc 22 preferably formed of a non-magnetic material, the disc and U-shaped member being fastened together by any well known means. The disc 22 is attached to a cylinder 24 by cap screws 25, the cylinder also being formed of a non-magnetic material.

Surrounding each leg of the U-shaped member 21 is a coil 26, the two coils being connected in series to a cable 27. The casing 19 is permanently attached to an annular member 28 which supports the cylinder 24 and which is attached thereto by cap screws 29. Between the cylinder 24 and the disc 22 is placed a shim 31 for a purpose which will be described hereinafter. The annular member 28 is provided with eye bolts 32 to which lowering cables may be attached for the purpose of submerging the microphone in a body of water. Clamped to the annular member 28 is a diaphragm 33, the diaphragm being held in place by bolts 35, the diaphragm 33 being lapped to the annular member 28 for the purpose of preventing leakage of water into the interior of the casing 19. The diaphragm 33 carries a laminated armature 37 which is made of a highly permeable magnetic material such as Permalloy.

At the upper end of the casing 19, an internal shoulder 38 is provided. A disc 39 rests on said shoulder and is arranged to support a cylindrical body 41 of elastic material such as soft rubber. A disc 42 similar to the disc 39 rests upon the elastic material, the two discs being forced toward each other by means of bolts 43 and nuts 44. The discs 39 and 42 are provided with apertures 45 and 46 respectively through which pass the cable 27, the elastic material also being provided with an aperture in alignment with the apertures 45 and 46. This arrangement provides a watertight seal for the upper end of the casing 19 as tightening of the nuts 44 will force the elastic material between the discs 39 and 42 into close engagement with the walls of the casing 19 and with the cable 27.

Referring to Fig. 1, the cable 27 of the microphone unit 18 is connected into the bridge arm 11 which also includes a condenser 47 shunted across the cable. The arm 12 of the bridge network comprises a variable resistance 48, the arms 13 and 14 being comprised of fixed resistances 49 and 51 respectively which are preferably similar in value. The output terminals 52 and 53 of the bridge network are connected to the primary winding 54 of a transformer shown generally by the numeral 55, the terminal 53 being connected to the primary winding 54 by means of a single pole double throw switch 56 which is biased towards one of its contacts 57. The other contact 58 of the switch 56 is connected to a tap 59 on the resistance 49.

The secondary winding 61 of the transformer 55 is connected through a variable gain adjustment 62 to an amplifier 63, the output of which is connected to a demodulator 64 and a switch 79. The output of the demodulator is connected through a variable gain adjustment 65 to a band pass amplifier 66 which is designed to pass a band of frequencies ranging between one and one hundred cycles per second. The upper limit of the band may be chosen to be any value of frequency below which it is desired to measure the aforementioned transient pressure phenomena. The connection between the demodulator 64 and the band pass amplifier 66 includes therein a single pole double throw switch 67 which is biased towards one of its contacts 68. The purpose of the other contact 69 of the switch 67 will be described hereinafter.

The band pass amplifier 66 is connected to a modulator 71, the latter being supplied from the oscillator 17 or from any other oscillator which produces a frequency which is capable of being easily recorded on a phonograph record by means of the conductors 70 connected therebetween, it being not feasible to record the low frequencies passed by the band pass amplifier. The output of the modulator 71 is amplified in an amplifier 72, the output of which is supplied to the cutting arm 73 of a recorder indicated generally by the numeral 74. An oscilloscope 75 is connected to indicate the output of the modulator 71 for a purpose to be described hereinafter.

A sixty cycle per second oscillator 76 is connected through a variable potentiometer 77 to the input of the band pass amplifier 66 by means of the switch 67 when said switch is thrown to make contact with its contact 69. A recording milliammeter 78 is connected by means of a double pole double throw switch 79 to indicate either the output voltage of the amplifier 63 or the output voltage of potentiometer 77. An amplifier 81 and a rectifier 82 for rectifying the output of the amplifier 81 are arranged in the connections between the switch 79 and the recording milliammeter 78. If desired, the amplifier 81, rectifier 82 and milliammeter 78 may be replaced by any recording alternating current voltmeter other than the type illustrated.

Referring now to Fig. 3, there is shown thereon a phonograph 83 having a pickup arm 84, the latter being connected to an amplifier 85. The output of the amplifier is demodulated in a demodulator 86 and then passed through a low pass filter 87, the low pass filter eliminating all frequencies above one hundred cycles per second or the upper cut-off frequency of amplifier 66. The output of the low pass filter is amplified in an amplifier 88, the output of which is supplied to a wave analyzer 89. The wave analyzer 89 is a device capable of selecting predetermined frequencies from currents or voltages containing a number of different frequencies. Such a device is illustrated in the patent to H. H. Scott, patented September 19, 1939, No. 2,173,426. Any other system capable of operating in a similar manner may be employed in place of the apparatus shown in the Scott patent. The output of the wave analyzer 89 is rectified by a rectifier 91 and is supplied to a recording milliammeter 92. The various amplifiers shown in Figs. 1 and 3 may have as many stages as necessary or may be omitted as the case may require.

The operation of the system will best be understood by reference to Figs. 1 and 3 of the drawings on which is shown in diagrammatic form the complete system. Referring first to Fig. 1, the arrangement shown therein is carried to a location on a body of water at which the desired measurements are to be made. The microphone unit 18 is submerged in the water to the desired depth by means of the eye bolts 32 and cables (not shown), the conducting cable 27 being unreeled a sufficient amount to permit this. Prior to submergence of the microphone, a shim 31 of the proper thickness is placed within the microphone, as illustrated in Fig. 2, so as to space the armature 37 from the poles of the U shaped member 21 a distance which will render linear the response of the microphone at the particular range of depths through which measurements are to be made as explained hereinabove. The system is now energized, the oscillator 17 supplying one kilocycle per second energy to the bridge network.

Before any measurements can be made it is necessary to balance the bridge network. The switch 79 is thrown to its upper position and the variable gain adjustment 62 is adjusted in a direction so as to increase the gain of the system while keeping the pen of the recording milliammeter 78 on its scale. Simultaneously with this adjustment, the variable condenser 47 and the variable resistance 48 are adjusted until the bridge network is balanced and the pen of the milliammeter 78 reads zero. The effect of the adjustment of the variable condenser 47 is to render the arm 11 resonant by compensating for the inductance of the coils 26 of the microphone unit 18 and the capacitance of the cable 27. Adjusting the resistance 48 has the effect of bringing the bridge balance to null.

It is now necessary to adjust the system so that the recording milliammeter 78 will remain on scale for all expected variations in pressure which affect the microphone unit 18 and so that each point on the trace recorded by the milliammeter can be interpreted in the light of a known standard. To calibrate the system, the switch 56 is operated to make contact with the contact 58 which, being connected to the tap 59 on the resistance 49, will unbalance the bridge network by a known amount representative of a known pressure on the microphone diaphragm. Experience will teach the operator what minimum and maximum values of pressures are to be expected on the microphone unit 18 in the range of depths to be measured and the unbalance signal produced by tap 59 is translated into a selected reading of the milliammeter 78 of such value that the expected minimum and maximum values of pressure will not operate the pen of the recording milliammeter off scale but will operate the pen over as much of the scale as possible to produce a trace of the largest possible amplitude when measurements are being made. With the switch 56 held in contact with the contact 58, the variable gain adjustment 62 is adjusted so that the recording milliammeter 78 reads exactly at said selected scale reading. The switch 56 is returned into contact with contact 57 as the milliammeter 78 is now calibrated in accordance with a known standard and any point on the trace made thereby can be evaluated by computing the pressure required on the microphone diaphragm to produce it with reference to the pressure on the diaphragm required to produce said selected scale reading.

It is necessary to operate the bridge network off balance in order to prevent double frequency modulation of the signal therefrom. The bridge network is, therefore, unbalanced by decreasing the capacity of the variable condenser 47 which, while rendering the bridge arm 11 non-resonant does so by only a small amount. Furthermore, experience has shown that the largest changes in pressure on the microphone unit 18 usually are in a direction to decrease the inductance of the coils 26 so that by decreasing instead of increasing the capacity of the arm 11, it is made certain that the bridge network does not pass through resonant balance, thus adversely affecting the operation of the one to one hundred cycle per second channel, in case there was an error in judgment as to the magnitude of the required unbalance. The bridge network is unbalanced by decreasing the capacity of the condenser 47 until the recording milliammeter 78 reads a value which has been found satisfactory to maintain the pen of the recording milliammeter on the scale for all measurements of subsurface pressure. It may here be pointed out that the recording milliammeter 78 acts as a mechanical filter by reason of its inertia so that it responds only to measurements of a frequency of substantially one cycle per second or less.

It is also necessary to calibrate the remainder of the system so that the pressure frequencies from one to one hundred cycles per second to be recorded on the recorder 74 can be interpreted in the light of a standard. The switch 79 is thrown to its lower position so as to connect the oscillator 76 to the milliammeter 78 and the variable potentiometer 77 is then set at a value such that the recording milliammeter 78 registers a predetermined reading which reading provides a standard for later correlation with the recorded measurements. The switch 79 is then returned to its upper position. The variable gain adjustment 65 which is provided with a calibrated scale, is set at a value on said scale which previous experience has taught will insure that the modulator 71 is fed at a proper voltage to prevent over-modulation. A note is made of this setting as it also comprises a factor which must be considered subsequently in interpreting the recorded measurements.

The recorder 74 is now provided with a record and started with the cutting arm in place. The switch 67 is tact 69, the bridge network being disconnected from the thrown to the left so as to make contact with the contact band pass amplifier 66 and the oscillator 76 being connected thereto. The calibrating signal from the oscillator 76 is now recorded for about fifteen seconds and the switch 67 is then released so as to disconnect the oscillator 76 and reconnect the bridge network. The recorder is permitted to run for a length of time sufficient for the microphone to respond to any changes of subsurface pressure which it is desired to study. Upon completion of such pressure measurements, the calibration switch 67 is moved to the left to make contact with the contact 69 so as to again record a calibration signal from the oscillator 76, the bridge network having been removed from circuit by the separation of the switch 67 from its contact 68. While the measurements are being recorded, the oscilloscope 75 is watched for evidence of over-modulation which will render the measurements inaccurate.

The microphone may now be raised or lowered and the foregoing procedure repeated until as many records of the subsurface phenomena as desired have been made. The microphone is then removed from the water and the system deenergized, the trace recorded on the milliammeter 78 and the record on the phonograph 74 being removed from the apparatus for further study.

It will be apparent that the trace taken from the recording milliammeter 78 will indicate all changes in the subsurface pressure of less than one cycle per second, the record which was cut on the recorder 74 recording all changes in pressure from one cycle to one hundred cycles per second. As pointed out hereinbefore, it is desirable to analyze the recorded measurements at various frequencies from one to one hundred cycles per second. This can be achieved by the apparatus illustrated in Fig. 3.

Referring to Fig. 3, the phonograph record removed from the recorder 74 of Fig. 1 is placed on the playback phonograph 83, the pickup 84 being placed in the proper position to produce signals corresponding to the record groove. The output of the pickup 84 is amplified by the amplifier 85, the output of which is demodulated in the demodulator 86. The low pass filter 87 eliminates all frequencies above the upper cut-off frequency of amplifier 66, which in the instant case is one hundred cycles per second, from the signal received from the demodulator. After the output of the low pass filter is amplified in the amplifier 88 it is supplied to the wave analyzer 89. This wave analyzer, as hereinbefore stated, is capable of selecting signals of any desired frequency for the purpose of analysis thereof. The output of the analyzer is rectified in the rectifier 91 and the amount of this particular frequency will appear as a trace on the recording milliammeter 92. If it is desired to analyze the recorded measurements at any other frequencies, it is merely necessary to replay the record on the phonograph 83 after adjusting the wave analyzer for another of the desired frequencies, the trace on the milliammeter 92 now appearing as a record of the amount of said frequency. It is obvious that, within the life of the record, any number of analyses of the recorded subsurface pressure phenomena may be made.

As the record contains a standard sixty cycle per second oscillation recorded thereon, it is possible to compare each point of the trace recorded on the milliammeter 92 with the magnitude of the sixty cycle per second trace and if all of the constants and the various settings of the system are known, the actual pressures which caused each variation in the trace may be computed. As stated hereinbefore, such knowledge is valuable in determining the effects of subsurface pressure phenomena.

When it is desired to calibrate the microphone 18 to determine one of the constants of the system, means is employed for applying known pressures to the diaphragm 33. The term calibration as employed herein with respect to the microphone is defined as the ratio of the unbalance in the bridge produced by a unit change in pressure on the microphone to the unbalance produced in the bridge by the operation of switch 56.

The amount of bridge unbalance is measured by the milliammeter 78 when switch 79 is in the upward position. The method consists of applying a known pressure to the diaphragm 33 of the microphone, balancing the bridge and operating the switch 56 to engage the contact 58 thereof. A notation is made of the deflection on the milliammeter 78. Switch 56 is now moved into engagement with contact 57. The pressure on the diaphragm 33 is decreased by a small known amount and the deflection on the recording milliammeter 78 is again noted. The calibration factor of the microphone is expressed as the ratio of the second deflection of the milliammeter to the first deflection thereof in which the ratio is divided by the aforesaid known decrease in pressure. During the foregoing operation the adjustment of the attenuation control 62 is, of course, left unchanged.

On Fig. 4 is disclosed in diagrammatic form a circuit arrangement suitable for calibrating the apparatus intermediate the output of the bridge network and the input of amplifier 66 of Fig. 1, the apparatus comprising a source 80 of one kilocycle voltage modulated at a known modulation factor and having a frequency the same as the oscillator 76. A switch S is employed to disconnect the adjustable gain or attenuating device 62 from the secondary winding 61 of the transformer 55 and connect the calibrating apparatus to the attenuating device 62 selectively in accordance with the operated position of the switch. It will, of course, be understood that the calibrating apparatus 80 may be employed to calibrate the aforesaid apparatus intermediate the bridge network and the input of amplifier 66 before or after the employment of the system of Fig. 1 under actual conditions of service in the field.

The method of determining the calibration constant or factor of the apparatus intermediate the output of the bridge network and the amplifier 66 of Fig. 1 by means of the arrangement of Fig. 4 will now be described. The calibration constant or factor as employed herein is defined as the ratio of the voltage at the input to the amplifier 66 resulting from a unit input signal at 62 with the switch 67 in engagement with contact 68 and with the arrangement of Fig. 4, to the voltage at the amplifier 66 when the switch 67 is moved into engagement with contact 69. These voltages may be measured by applying a high impedance voltmeter to the input terminals of the amplifier 66 or by visual inspection of percent modulation of the wave on the oscilloscope 75 or, if desired, by the recording milliammeter 92 of Fig. 3.

When it is desired to calibrate the apparatus arranged intermediate the bridge and the amplifier 66, switch S, Fig. 4, is operated to connect the calibration apparatus 80 to the variable gain control 62. With the switch 79 in the upper position, the deflection on the recording milliammeter 78 and the voltage at amplifier 66 are observed, the gain control 62 having been previously adjusted to effect a convenient deflection of the milliammeter 78 sufficient to obtain an accurate reading of the milliammeter. Switch S is now returned to its normal position connecting the gain control 62 to the bridge transformer secondary winding 61. The switch 67 is now moved into engagement with the contact 69, Fig. 1, thereby to connect the oscillator 76 by way of the gain control 77 to the band pass amplifier 66. The switch 79 is moved to the downward position and the gain control 77 is adjusted to effect a predetermined deflection on the recording milliammeter 78. The voltage at the input of the amplifier 66 is again observed. More specifically, the calibration constant or factor may be defined as the ratio of the first observed voltage to the second observed voltage, in which the ratio is divided by the first reading on milliammeter 78 and by the known modulation factor of the signal from apparatus 80.

Briefly stated in summary, the present invention contemplates the provision of a new and improved method and apparatus for analyzing transient pressures in a body of water which is adapted to record accurately all of such pressures in a form which may easily be analyzed at leisure and which may be studied minutely at all desired frequencies without the necessity of repeating the measurements.

While the invention has been described in detail with respect to a certain preferred example thereof which gives satisfactory results, it will be understood by those skilled in the art, after understanding the invention, that various features of the system disclosed and claimed herein may advantageously be employed in types of sound or pressure recording systems other than that disclosed and that various modifications and changes may be made without departing from the spirit and scope of the invention, and it is intended, therefore, in the appended claims to cover all such changes and modifications.

The invention herein described and claimed may be manufactured and used by and for the Government of the United States of America for governmental purposes without payment of any royalties thereon or therefor.

What is claimed as new and desired to be secured by Letters Patent of the United States is:

1. In a measuring apparatus, in combination, a bridge network comprising a plurality of arms and input and output terminals, a microphone having an inductive winding in one of said arms, a source of alternating current connected to said input terminals, an electroresponsive device connected to said output terminals, and adjustable means for rendering said one arm resonant to said alternating current.

2. In a measuring apparatus, in combination, a bridge network comprising a plurality of arms and input and output terminals, a microphone having an inductive winding in one of said arms, a capacitance shunted across said winding, a source of alternating current connected to said input terminals, an electroresponsive device connected to said output terminals, and means for adjusting said capacitance to render said one arm resonant to said alternating current.

3. In a measuring apparatus, in combination, a bridge network comprising a plurality of arms and input and output terminals, a microphone having an inductive winding in one of said arms, a capacitance shunted across said winding, a source of alternating current connected to said input terminals, an electroresponsive device connected to said output terminals, and means for adjusting said capacitance to render said bridge network resonant to said alternating current.

4. In a measuring apparatus, in combination, a bridge network comprising a plurality of arms and input and output terminals, a microphone having an inductive winding in one of said arms, a capacitance shunted across said winding, a resistance in another of said arms, a source of alternating current connected to said input terminals, an electroresponsive device connected to said output terminals, and adjusting means for individually adjusting said resistance and said capacitance to both balance said bridge network and render it resonant to said alternating current.

5. In an apparatus for recording low frequency waves, a bridge network comprising a plurality of arms and input and output terminals, a microphone having a winding in one of said arms, a source of alternating current connected to said input terminals for producing a modulated unbalance voltage across the said output terminals when a low frequency wave impinges on the microphone, means connected to said output terminals for demodulating said modulated unbalance voltage, a filter controlled by said demodulating means for eliminating all frequencies from the demodulated unbalance voltage above a predetermined value, a recording means, a second source of alternating current having a frequency which may be readily recorded, means to modulate said second alternating current by the output of said filter, said last named means being connected to energize said recording means.

6. In an apparatus for indicating underwater pressures, a bridge network comprising a plurality of arms and input and output terminals, a microphone adapted to be placed at a predetermined depth in a body of water, said microphone having a winding connected by a cable to one of the arms of the bridge network, a capacitance shunted across said cable, a source of alternating current connected to said input terminals, means for adjusting said capacitance and said bridge network to render said bridge network non-resonant to said alternating current by a predetermined amount when the microphone is placed at said predetermined depth, and indicating means connected to said output terminals and operating as a filter so as to be responsive only to frequencies of the order of one cycle per second or less.

7. In an apparatus for indicating underwater pressures, a bridge network comprising a plurality of arms and input and output terminals, a microphone adapted to be placed at a predetermined depth in a body of water, said microphone having a winding connected by a cable to one of the arms of the bridge network, a capacitance shunted across said cable, a source of alternating current connected to said input terminals, means for adjusting said capacitance and said bridge network to render said bridge network non-resonant to said alternating current by a predetermined amount when the microphone is placed at said predetermined depth, indicating means, switching means for unbalancing the bridge network a predetermined amount, attenuating means connected between said output terminals and the indicating means, and means for adjusting the attenuating means so that the indicating means registers a predetermined reading when the switching means unbalances the bridge network.

8. In an apparatus for recording underwater pressures, a bridge network comprising a plurality of arms and input and output terminals, a microphone adapted to be placed at a predetermined depth in a body of water, said microphone having a winding connected by a cable to one of the arms of the bridge network, a capacitance shunted across said cable, a source of alternating current having a frequency of the order of one kilocycle per second connected to said input terminals, means for adjusting said capacitance and said bridge network to render said bridge network non-resonant to said alternating current by a predetermined amount when the microphone is placed at said predetermined depth, a demodulator responsive to said alternating current connected to the output terminals of said bridge network, a filter controlled by said demodulator for eliminating all frequencies above a predetermined value when said microphone responds to variations in pressure in the body of water, a recording means, and means to modulate said alternating current by the output of said filter, said last named means being connected to energize said recording means.

9. In an apparatus for recording underwater pressures, a bridge network comprising a plurality of arms and input and output terminals, a microphone adapted to be placed at a predetermined depth in a body of water, said microphone having a winding connected by a cable to one of the arms of the bridge network, a capacitance shunted across said cable, a source of alternating current having a frequency of the order of one kilocycle per second connected to said input terminals, means for adjusting said capacitance and said bridge network to render said bridge network non-resonant to said alternating current by a predetermined amount when the microphone is placed at said predetermined depth, a demodulator responsive to said alternating current connected to the output terminals of said bridge network, a filter controlled by said demodulator for eliminating all frequencies above a predetermined value when said microphone responds to variations in pressure in the body of water, a recording means, a second source of alternating current having a frequency of a value capable of passing said filter and of predetermined magnitude, and means for disconnecting the bridge network from the filter and connecting said second source to the filter.

10. In an apparatus for measuring underwater pressures, a record, means for recording said pressures on said record as a modulated alternating current wave, means responsive to said record for generating an electric signal which is a reproduction of said modulated alternating current wave, means for demodulating said signal, a wave analyzer responsive to the demodulated signal, said wave analyzer being adjustable to any selected component frequency of said demodulated signal, and a recording means connected to said wave analyzer.

11. In an apparatus for measuring underwater pressures, a record, means for recording said pressures on said record as a modulated alternating current wave, means responsive to said record for generating an electric signal which is a reproduction of said modulated alternating current wave, means for demodulating said signal, a wave analyzer responsive to the demodulated signal, said wave analyzer being adjustable to any selected component frequency of said demodulated signal, means to rectify said selected component frequency of said demodulated signal, and a recording means connected to said rectifier.

12. The method of measuring underwater pressures of a low frequency which comprises the steps of; converting the pressure changes into modulations of an alternating current having a frequency which is readily recorded, recording said modulated alternating current, reproducing said modulated alternating current, demodulating said reproduced current, analyzing said demodulated current at selected component frequencies thereof, and converting said analysis of each of said selected component frequencies into a recorded trace.

13. The method of measuring underwater pressures of a low frequency which comprises the steps of; converting the pressure change into corresponding changes of electric current, separating the higher frequency components of the electric current from the lower frequency components of said current, recording a trace of the lower frequency components, converting the higher frequency components into modulations of an alternating current having a frequency which is readily recorded, recording said modulated alternating current, reproducing said modulated alternating current, demodulating said reproduced current, analyzing said demodulated current at selected component frequencies thereof, and converting said analysis of each of said selected component frequencies into a recorded trace.

14. In an apparatus for measuring underwater pressures, a bridge network, a reactive microphone electrically connected to said bridge network, a source of alternating current electrically connected to said bridge network, adjustable electrical means in electrical connection with said bridge network to render said bridge network non-resonant to said alternating current, and electric recording means electrically connected to said bridge network.

15. In an apparatus for measuring underwater pressures, a bridge network, a reactive microphone, an electrical cable electrically connecting said microphone to said bridge network and of sufficient length to permit said microphone to be lowered to a predetermined depth, a capacitance shunted across said cable, a source of alternating current electrically connected to said bridge network, means for adjusting said capacitance and said bridge network to render said bridge network non-resonant to said alternating current when said microphone is lowered to any predetermined depth, and recording means electrically connected to said bridge network.

16. Apparatus for measuring low frequency pressure changes comprising, in combination, a source of alternating current, a pressure responsive inductive means energized from said source for producing signals corresponding to said pressure changes as modulations of said alternating current, an electroresponsive device connected to said inductive means and responsive to said signals, and adjustable means for rendering the inductive means non-resonant to the alternating current.

References Cited in the file of this patent

UNITED STATES PATENTS

| | | |
|---|---|---|
| 1,321,197 | Fay | Nov. 11, 1919 |
| 1,419,596 | Wood | June 13, 1922 |
| 1,428,156 | Espenschied | Sept. 5, 1922 |
| 1,440,361 | Hopwood | Dec. 26, 1922 |
| 1,526,414 | Du Bois-Reymond | Feb. 17, 1925 |
| 1,994,232 | Shuck | Mar. 12, 1935 |
| 2,078,796 | Greentree et al. | Apr. 27, 1937 |
| 2,167,630 | Bazzoni et al. | Aug. 1, 1939 |
| 2,342,171 | Turner, Jr. | Feb. 22, 1944 |